US011106994B1

(12) United States Patent
Batalov

(10) Patent No.: US 11,106,994 B1
(45) Date of Patent: Aug. 31, 2021

(54) TUNING OF MACHINE LEARNING MODELS USING ACCURACY METRICS SELECTED TO INCREASE PERFORMANCE

(71) Applicant: Amazon Technologies, Inc., Seattle, WA (US)

(72) Inventor: Denis V. Batalov, Luxembourg (LU)

(73) Assignee: Amazon Technologies, Inc., Seattle, WA (US)

( * ) Notice: Subject to any disclaimer, the term of this patent is extended or adjusted under 35 U.S.C. 154(b) by 800 days.

(21) Appl. No.: 15/283,037

(22) Filed: Sep. 30, 2016

(51) Int. Cl.
*G06N 20/00* (2019.01)
*G06N 5/04* (2006.01)

(52) U.S. Cl.
CPC .............. *G06N 20/00* (2019.01); *G06N 5/04* (2013.01)

(58) Field of Classification Search
CPC ................................. G06N 20/00; G06N 5/04
See application file for complete search history.

(56) References Cited

U.S. PATENT DOCUMENTS

| 2011/0105854 | A1* | 5/2011 | Kiani | ..................... | G16H 40/63 600/300 |
| 2014/0344193 | A1* | 11/2014 | Bilenko | ................. | G06N 20/00 706/12 |

OTHER PUBLICATIONS

Andrew P. Bradley, "The Use of the Area Under the ROC Curve in the Evaluationof Machine Learning Algorithms" by the University of Queensland, Australia, 1997, vol. 30, No. 7 pp. 1146-1159. (Year: 1997).*
Karimollah Hajian-Tilaki,"Receiver Operating Characteristic (ROC) Curve Analysis for Medical Diagnostic Test Evaluation" by Babol University of Medical Sciences, Babol, Iran, Spring 2013, vol. 4, No. 2, pp. 627-635. (Year: 2013).*
Weiss, Gary M., Kate McCarthy, and Bibi Zabar. "Cost-sensitive learning vs. sampling: Which is best for handling unbalanced classes with unequal error costs?." Dmin 7, No. 35-41 (2007). pp. 24. (Year: 2007).*

* cited by examiner

*Primary Examiner* — Kamran Afshar
*Assistant Examiner* — Urmana Islam
(74) *Attorney, Agent, or Firm* — Nicholson De Vos Webster & Elliott LLP

(57) ABSTRACT

A technology is provided for automated tuning of a machine learning model in a computing service environment. Predictive weights that include false positive outcomes, false negative outcomes, true positive outcomes, and true negative outcomes may be defined and/or received. A weight adjusted classification threshold, for use in a classification model of the machine learning model in a service provider environment, according to the predictive weights to enable the machine learning model to increase the total value of the machine learning model and decrease performance outcome errors. The improved classification threshold may be adjusted according to a change in the predictive weights. A data point may be classified according to the weight adjusted classification threshold in the classification model.

20 Claims, 7 Drawing Sheets

TUNING OF MACHINE LEARNING MODELS USING ACCURACY METRICS SELECTED TO INCREASE PERFORMANCE

BACKGROUND

Computing systems may be found in the workplace, at home, or at school. Computing systems may include computing and data storage systems to process and store data. Some computing systems have begun offering centralized, virtual computing options known as service provider environments that may reduce overall costs, improve availability, improve scalability, and reduce time to deploy new applications. For example, some computing systems may act as a service that provide virtual computing, virtual storage, virtual networking and other virtual services as purchased for variable periods or on a pay-per-use basis (e.g., pay for a certain amount of API (application program interface) transactions or bandwidth) from large pools of re-purposable, multi-tenant computing resources or services.

Computing devices may employ artificial intelligence, such as machine learning, to allow computers to simulate human intelligence and choices based on significant amounts of empirical data. Machine learning may take advantage of training examples to capture characteristics of interest and their underlying probability distribution, and a training data set may be used to train a machine learning model. Training data may be seen as examples that illustrate relations between observed variables and provide output labels (e.g., classification labels that are true or false). Machine learning may be used to learn to process complex patterns and make decisions based on data.

DETAILED DESCRIPTION

Figure 1:
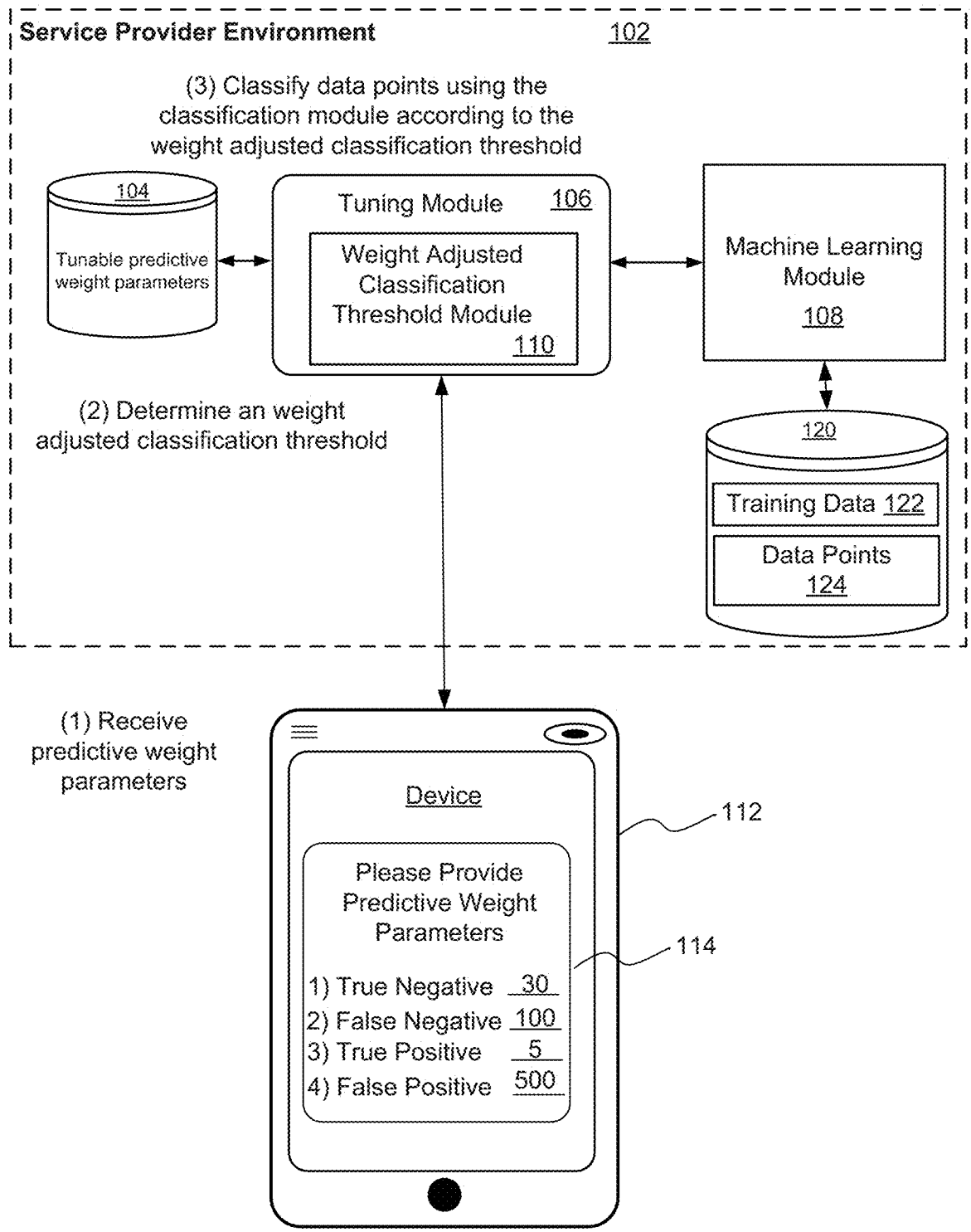
FIG. 1 illustrates a system for tuning of a machine learning model in service provider environment according to an example of the present technology.

This technology provides computing systems with robust means to tune machine learning models. In one aspect, the present technology provides for tuning a machine-learning model by selecting a weight adjusted classification threshold using predictive weights. The machine learning model may be hosted in a service provider environment. Predictive weights that represent costs for false positive outcomes, false negative outcomes, true positive outcomes, and true negative outcomes may be defined and/or received. A weight adjusted classification threshold (e.g., an improved weight adjusted classification threshold) for use in a classification machine learning model in a service provider environment, may be modified according to the predictive weights to enable the machine learning model to improve the total value of the machine learning model and decrease performance outcome errors. The improved classification threshold may be adjusted according to a change in the predictive weights or data supplied for the weighted costs provided for the predictive outcomes. A data point may be classified according to the weight adjusted classification threshold in the classification model.

In one aspect, the present technology may automatically select the weight adjusted classification threshold based costs or values provided for false positive outcomes, false negative outcomes, true positive outcomes, and true negative outcomes, which may then be considered a defined predictive weight. This is in contrast to current machine models which base a threshold purely on relative proportions of false positive and false negatives, which are treated as the same cost. By defining the predictive weights (e.g., the four weight values) the machine learning model may be tuned by identifying and selecting the improved threshold parameter.

For example, the present technology may use a machine learning (ML) classification model (e.g., "classifier"), such as a binary classification model or multi-class classification model built by a machine-learning (ML) module in a service provider environment. In one aspect, the present technology may integrate an automated threshold selection module (e.g., for determining the "weight adjusted classification threshold"), which may tune a ML model to the specifications of a user, such as a customer in the service provider environment, based on the predictive weights. In one aspect, the ML classifier model may output a score between zero "0" and "1" for each data point and/or features of the data point. The weight adjusted classification threshold may be applied to determine if a data point belongs to class 0 or class 1. For instance, if the weight adjusted classification threshold is selected to be 0.3 then the prediction for the sample event with a score of 0.45 may be classified as belonging to class 1 and prediction for a sample event with score 0.27 may be classified as belonging to class 0.

In this way, the present technology provides improvements over current machine learning systems which are unable to tune a ML model to the specification of a user by creating a weight adjusted classification threshold, such as a customer in the service provider environment, based on the dynamically received and/or defined predictive weights.

FIG. 1 illustrates a system 100 for tuning of a machine-learning model in computer environment, such as a service provider environment 102, according to an example of the present technology. The system 100 may include the service provider environment 102 and a device 112, such as a desktop computer, laptop computer, tablet, smart phone, and/or another electronic device that may have one or more processors and memory. The device 112 and the service provider environment 102 may each be associated with and/or in communication with each other, by one or more communication methods, such as a computing network. In one example, the device 112 may be controlled by an owner or customer associated with the service provider environment 102. In another example, the device 112 may be completely independent from the owner or customer of the service provider environment 102.

In one aspect, the service provider environment 102 may provide virtualized computing services (i.e., virtualized computing, virtualized storage, virtualized networking, etc.) to devices 112. More specifically, the service provider environment 102 may provide virtualized computing, virtualized storage, virtualized networking and other virtualized services that are executing on a hardware substrate.

In one aspect, the service provider environment 102 may include a tuning module 106, a machine learning module 108, a data store 120 having training data 122 and data points 124, and tunable predictive weight parameters database 104 that is associated with the tuning module 106. The tuning module 106 may include a weight adjusted classification threshold module 110. In one aspect, the device 112 may include a graphic user interface 114 enabled to display on the device 112 one or more user interface controls for a customer to enter predictive weights (e.g., 30, 100, 5, 500 as depicted in FIG. 1). For example, the GUI interface 114 may display selection options or entry options for a customer to select or enter the predictive weights. For example, the GUI interface 114 may display on the device 112 "please provide predictive weights" and may then provide entry may be defined or received that include false positive outcomes, false negative outcomes, true positive outcomes, and true negative outcomes. The device 112 may communicate the predictive weights to the tuning module 106.

In operation, 1) the tuning module 106 may receive the predictive weights from the device 112. The predictive weights may represent each of the predictive weights as one of an acceptable performance baseline or acceptable performance outcome errors in the classification model of the tuning module 106. For example, the predictive weights may be a defined value, percentage, weight, and/or other statistical measurement capable of reflecting, representing, and/or measuring the acceptable performance baseline and acceptable performance outcome errors. 2) The weight adjusted classification threshold module 110 may determine and/or select a weight adjusted classification threshold, for use in a tuning module in communication with the machine learning module 108 according to the predictive weights to enable the machine learning module 108 to increase the total value of the machine learning model and decrease performance outcome errors of a data point. For example, a user may enter into the GUI interface 114 defined predictive weights in response to the "please provide predictive weights" and that define the false positive outcome weight as "500", false negative outcome weight as "100", true positive outcome weight as "5", and true negative outcome weight as "30". 3) A data point may be classified according to the weight adjusted classification threshold in the classification machine learning model of the machine learning module 108. The data point may be stored in the data store 120 with one or more other data points 124.

The weight adjusted classification threshold may be determined, selected, and/or calculated according to mathematical operations or functions that may involve one or more mathematical operations (e.g., using addition, subtraction, division, multiplication, standard deviations, means, averages, statistical modeling using statistical distributions, by finding minimums, maximums or similar thresholds for combined variables, etc.). For example, consider the following example and function where a threshold (H) may be determined.

In one aspect, the values of false positive (FP) outcomes may be represented as "FP(H)" that may result in a percentage of false positives. Values of false negative (FN) outcomes may be represented as "FN(H)" that may result in a percentage of false negatives. Values of true positive (TP) outcomes may be represented as "TP(H)" that may result in a percentage of true positives. Values of true negative (TN) outcomes may be represented as "TN(H)" that may result in a percentage of true negatives. The tuning module 106 may automatically select, determine, and/or identify the threshold (H) based on the function being optimized. For example, if it is desired to optimize for total error, then the tuning module 106 effectively searches for a threshold (H) that minimizes the sum of all false positive outcomes and false negative outcomes, which may be represented as the function or equation:

$$\text{MIN}(\text{FP}(H)+\text{FN}(H)) \tag{1}$$

However, the present technology may allow for a weight adjusted classification threshold or weighted optimization by identifying a performance baseline and/or cost (e.g., monetary cost, cost of performance, cost of time and/or cost of computing resources). So if the corresponding performance baseline and/or costs are for the performance baseline and/or costs of TP (CTP) or cost of the true positive, performance baseline and/or costs are for the performance baseline and/or costs of FP (CFP) or cost of the false positive, the performance baseline and/or costs of TN (CTN) or cost of the true negative, and the performance baseline and/or costs of FN (CFN) or costs of the false negative, then the tuning module may automate the discovery, calculation, identification, and/or selection of a weight adjusted classification threshold value that minimizes the following function or equation:

$$\text{MIN}(\text{TP}(H)*\text{CTP}+\text{FP}(H)*\text{CFP}+\text{TN}(H)*\text{CTN}+\text{FN}(H)*\text{CFN}) \tag{2}$$

Also, one or more alternative functions may also be optimized according to user specifications and/or definitions based on a defined or selected machine learning model to increase the total value of the machine learning model and decrease performance outcome errors. In one aspect, upon discovery, calculation, identification, and/or selection of a machine learning model, the weight adjusted classification threshold may take into account the performance baseline and/or costs, a comparison may be made of the performance of the ML model to both the performance baseline (i.e., assume that there is no cost to an incorrect outcome) but also to other functions that may be applicable to identifying the weight adjusted classification threshold for alternative performance baseline and/or costs. In one example aspect, "churn" of customers may represent an estimation of a possibility that the customer will terminate or stop being a customer of a business, such as a customer of the service provider environment. For example, the customer may churn from the service provider environment for one or more reasons, such as, for example by an excessive number of customer service calls with complaints regarding one or more services provided by the service provider environment. Thus, the weight adjusted classification threshold may include a churn rate of false positive (FP) and false negative (FN) errors and may compare the weight adjusted classification threshold for churn clients as used in independent ML models.

In this way, the present technology overcomes the problem and challenge of current ML models where it is difficult for a customer to select a classification threshold by programmatically selecting the weight adjusted classification threshold using each of the predictive weights provided by the customer(s), particularly since current ML models are rudimentary and do not take into account the costs of making the two kinds of mistakes, namely, false positives (FP) and false negatives (FN), essentially assuming that the respective costs are exactly the same.

In any practical application, the costs of the false positives (FP) and false negatives (FN) are not the same and finding a weight adjusted classification threshold that minimizes the overall cost of employing the ML model provides improvement to current ML models. Moreover, the present technology, as described herein, eliminates any constraint to force a customer to use additional computing resources to apply the ML classification model to the testing dataset which is effectively re-performing what a Machine Learning model in a computing system has already done on a testing data set. The present technology further 1) reduces the use of essential computing resources, 2) reduces a substantial amount of manual processes used by a classification ML model which is unable to auto tune a classification ML model, and 3) reduces unnecessary costs required by a computer environment.

In an alternative configuration of the technology, some of the predictive weight parameters may not be entered, supplied, or may be left blank. Predictive weights may then be suggested by the application or tuning module 106 in response to a desired outcome or a desired classification threshold as specified by a customer. In an example of trying to predict customer churn, the suggested predictive weight parameters may be used to determine how much money to spend for a retention program to retain customers with respect to a specified outcome of the model. This modeling may include setting a cost for a lost customer and the cost of the retention campaign may be left open or blank, and costs may be suggested for a desired outcome.

A total value or aggregated value (or conversely an overall cost or negative value) of the model per data point may be computed using the combined total values of the predictive weights (e.g. by summing, multiplying, or otherwise aggregating the predictive weights). In addition, the total value of the model may be multiplied by the number of data points classified (e.g., 10,000 data points multiplied by the model's total value) to come up a total cost of the model over time. The total value of the model with one set of predictive weights and a weight adjusted classification threshold may be compared to the model using other separate predictive weights to identify predictive models that are most useful to the system or a customer. For example, if the predictive weights represent dollars, time, distance, temperature, kilowatts, measurements (e.g., grams), or other real world values, then the total value or total cost of using the model with defined predictive weights may be computed.

An example baseline for the machine learning model may be represented as a weight of 100 for false positives, 100 for false negatives, 0 for true positives and 0 for true negatives. So, the total cost of the model may be 200. When the weight adjusted classification threshold is modified then the updated weights may be calculated and the total value may be computed and a new total value of the model may be represented as being, for example, 187. Accordingly, the total value of a model may be compared to the total value of other models to find decreased costs, increased total value and/or improved performance.

In another example, a baseline model may be represented in terms of a model that does not use machine learning, where weights may be assigned for certain simple or rule based outcomes. The non-machine learning baseline model may be represented using simple percentages, rules, a naive model with labels, thresholds to define outcomes, or as definitions what occurs if no action at all is taken. Further, the total value of the non-machine learning model may be calculated. Then a machine learning model may be compared against the non-machine learning baseline model to see if classification using machine learning can improve the total value of the model to a customer. If the machine learning improves the total value of the model then the machine learning model may be selected over the non-machine learning model by comparing the total value of the models.

Figure 2:
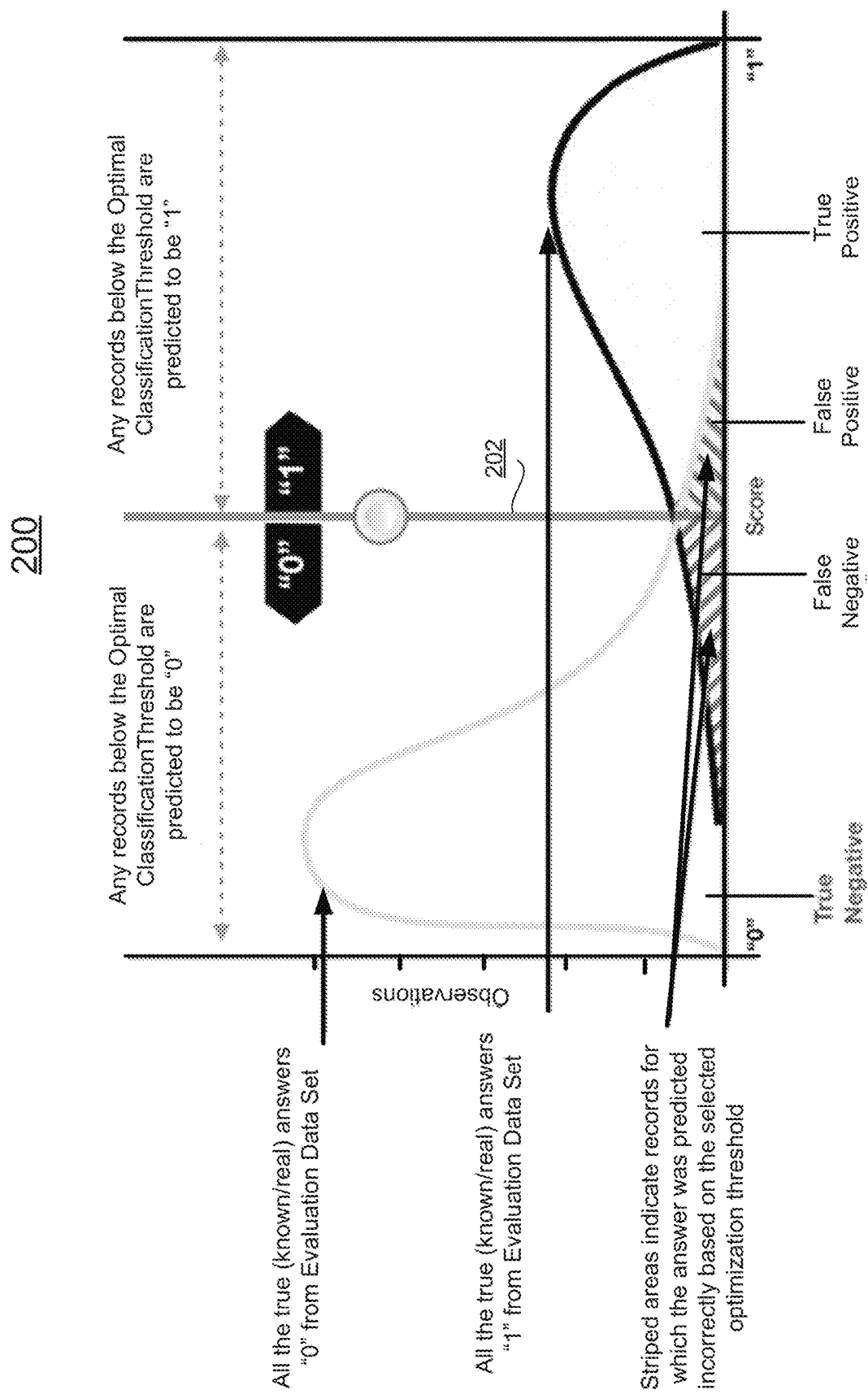
FIG. 2 illustrates a graph depicting machine learning performance using a classification model according to an example of the present technology.

FIG. 2 illustrates a graph 200 or histogram depicting idealized machine learning performance using a classification model according to an example of the present technology. In one aspect, one or more of the operations steps of FIG. 1 may also be included in one or more operations or actions of FIG. 2.

In one aspect, the graph 200 is a histogram that depicts an actual output of a binary classification model as a prediction score. The binary classification model may output a score that ranges from 0 to 1. The prediction score may indicates a computer system's certainty that a given observation belongs to a positive class (e.g., an actual target value is 1). In order to determine whether a decision about a data point is to be classified as 1 or 0, the score may be interpreted against the weight adjusted classification threshold 202. The predictive score may be compared against the weight adjusted classification threshold 202 to determine whether a label for the data point is to be a true or false prediction. Any observations with scores higher than the weight adjusted classification threshold 202 may be predicted as 1 or true, and scores lower than the weight adjusted classification threshold may be predicted as 0 or false.

In one aspect, any data point (e.g., records) with an output value below the weight adjusted classification threshold 202 may be predicted to be in class "0". Any data point (e.g., records) with an output value above the weight adjusted classification threshold 202 may be predicted to be in class "1". The graph 200 depicts the true (known/real) answers or "predictive outcome scores" that are "0" from an evaluation data set where the correct labels for the test data set are known and can be compared to the predictions. All true (known/real) answers that are "1" from an evaluation data set are shown in the histogram. The striped areas may indicate records for which the answer or "predictive outcome score" was predicted incorrectly based on the weight adjusted classification threshold 202. The Y-axis depicts the number of observations at each output value of the predictive outcome scores compared other outcomes and the X-axis depicts the score from 0 to 1.

In one aspect, a default weight adjusted classification threshold 202 may be defined as 0.5. Thus, according to system needs or user preferences, the weight adjusted classification threshold may be adjusted closer to 1 or closer to 0. The histogram 200 may be provided in a graphical user interface (GUI) interface and displayed on a device. The visualizations of the histogram may provide feedback to the device to illustrate the results of the sample events.

In one aspect, one or more ML models may include accuracy metrics for a binary classification model. The accuracy metrics may use Area Under the (Receiver Operating Characteristic) Curve (AUC). AUC may measure the ability of the ML model to predict a higher score for positive outcome events as compared to negative outcome events. Because it is independent of the score cut-off, a user may get a sense of the prediction accuracy of the ML model from the AUC metric without picking a threshold.

The graph 200 depicts two combined histograms: a) a histogram of the scores for the actual positives (the target is 1) and b) a histogram of scores for the actual negatives (the target is 0) in the evaluation data set. In one aspect, a ML model that has a greater predictive accuracy, as compared to other ML models, may predict a more accurate number of true and false outcomes. For example, a perfect model may have the two histograms at two different ends of the x-axis with no overlap showing that actual positive predictive outcomes all received high scores (e.g., classified as 1) and actual negative predictive outcomes all received low scores (classified as "0"). However, ML models are subject to errors, thus graph 200 depicts that the two histograms overlap at certain predictive outcome scores. In one aspect, an extremely poor performing ML model, as compared to the perfect ML model, may be unable to distinguish between the positive classes and negative classes, and both classes may have mostly overlapping histograms.

In one aspect, graph 200 depicts identification of a number of predictions that fall into the two types of correct class predictions and the two types of incorrect class predictions. In one aspect, the correct class prediction may be the predictive weights that include the True positive (TP) and True negative (TN). The True Positive in a ML model may be predicted as the value as 1, and the true value is 1. The True negative (TN) in a ML model may be predicted as the value as 0, and the true value is 0. The erroneous predictions may be the predictive weights that include the False positive (FP) and the False negative (FN). The False positive (FP) in a ML model may be predicted as the value as 1, but the true value is 0. The False negative (FN) in a ML model may be predicted as the value as 0, but the true value is 1. The number of TP, TN, FP, and FN may depend on the selected score weight adjusted classification threshold, and optimizing for any of one of these predictive weights may include changing one or more of the predictive weights. For example, a high number of TPs may results in a high number of FPs and a low number of TNs.

In one aspect, a ML model may generate numeric prediction scores for data points, and then compare the prediction score to the weight adjusted classification threshold to classify these scores into class "1" or class "0". By automatically adjusting the weight adjusted classification threshold, a ML model's behavior may be adjusted for errors.

For example, upon adjusting the predictive weights that include the false positive outcomes, false negative outcomes, true positive outcomes, and true negative outcomes, the weight adjusted classification threshold may enable the machine learning model to increase the total value of the machine learning model and decrease performance outcome errors. The improved classification threshold may be adjusted according to a change in the predictive weights. A data point may be classified according to the weight adjusted classification threshold in the classification model, such as a binary classification model. By dynamically selecting and/or adjusting the predictive weights according to the predictive weights, one or more trade-offs between the two types of errors (e.g., the erroneous predictions that include the False positive (FP) and the False negative (FN)) may be adjusted according to model specifications and/or user preferences.

In one aspect, by automatically adjusting the weight adjusted classification threshold and dynamically changing at least one of the predictive weights, the weight adjusted classification threshold may dynamically move to the left (in FIG. 2) to capture more true positives, but the trade-off may be an increase in the number of false positive errors. In an additional aspect, by automatically adjusting the weight adjusted classification threshold and dynamically changing at least one alternative of one of the predictive weights, the weight adjusted classification threshold may move to the right to captures less of the false positive errors, but the trade-off may that the weight adjusted classification threshold may miss some true positives. For a predictive application, the system and/or user of the tuning module may determine which kind of error is more tolerable by providing the predictive weight parameters which in term may automatically provide an appropriate weight adjusted classification threshold.

Moreover, the following additional metrics may be provided to measure the predictive accuracy of the ML model using the weight adjusted classification threshold. The additional metrics using the weight adjusted classification threshold may include accuracy, precision, recall, and false positive rate. In one aspect, the accuracy (ACC) may measure the fraction of correct predictive outcomes. The range may be from 0 to 1. For example, a larger value (e.g., a value closer to 1 than 0, such as 0.75) may indicate a more efficient predictive accuracy. The precision may measure a fraction of actual positives among those data points that are predicted as positive outcome. The range may also be 0 to 1. For example, a larger value (e.g., a value closer to 1 than 0, such as 0.75) may indicate a more efficient predictive accuracy. The recall may measure the fraction of actual positives that are predicted as positive. The range is 0 to 1. For example, a larger value (e.g., a value closer to 1 than 0, such as 0.75) may indicate a more efficient predictive accuracy. The false positive rate (FPR) may measure the false alarm rate or the fraction of actual negatives that are predicted as positive. The range may 0 to 1. For example, a smaller value (e.g., a value closer to 0 than 1, such as 0.25) may indicate a more efficient predictive accuracy.

Accordingly, using the weight adjusted classification threshold in a ML model may perform according to a specific subset of each of these metrics. For example, two computing applications might have very different requirements for their ML model. One computing application might need to be extremely sure about the positive predictions actually being positive (high precision), and be able to afford to misclassify some positive examples as negative (moderate recall). Another computing application may need to correctly predict as many positive examples as possible (high recall), and may accept some negative examples being misclassified as positive (moderate precision). By automatically calculating or determining the weight adjusted classification threshold according to the predictive weight parameters, the machine learning model is able to increase the total value of the machine learning model and decrease performance outcome errors. That is, the weight adjusted classification threshold provides for selecting the appropriate weight adjusted classification threshold that corresponds to a particular value of any of the preceding advanced metrics or the predictive weights. The weight adjusted classification threshold may also depict the tradeoffs incurred with optimizing for any one metrics or the predictive weights for a particular computing application and/or computing resource. For example, if the weight adjusted classification threshold is selected that corresponds to a high precision, there may be a trade that off with a lower recall.

Figure 3:
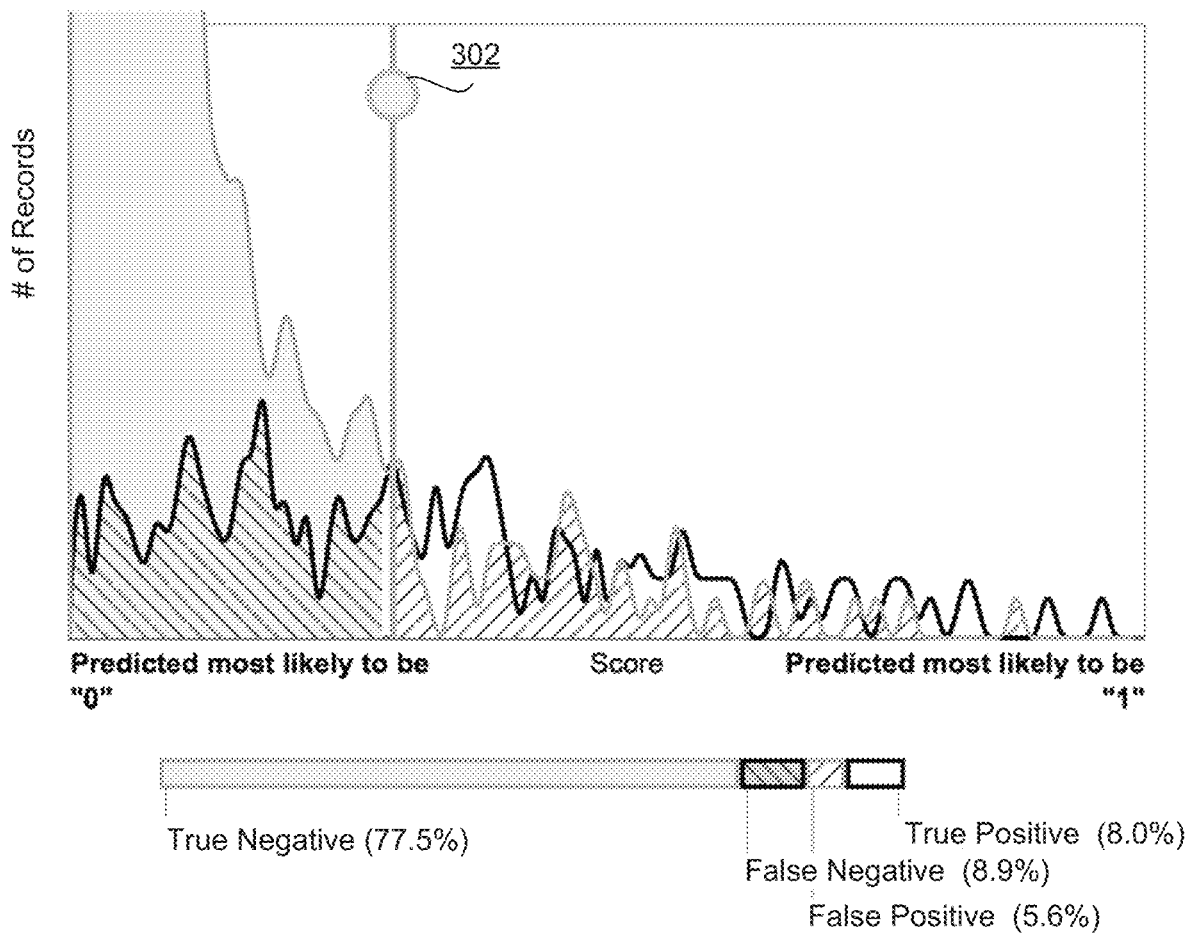
FIG. 3 illustrates a graph depicting tuning a machine learning module using predictive weights in a classification model according to an example of the present technology.

FIG. 3 illustrates a graph depicting tuning a machine learning module using predictive weights in classification machine learning model according to an example of the present technology. As depicted in FIG. 3, the Y-axis depicts the number of records at an outcome score or outcome value and the X-axis depicts the outcome score from 0 to 1. Any data point (e.g., records) below the weight adjusted classification threshold 302 may be predicted to be in class "0". Any data point (e.g., records) above the weight adjusted classification threshold 302 may be predicted to be in class "1". The weight adjusted classification threshold 302 may be selected according to the plurality of predictive weights to enable the machine learning model to increase the total value of the machine learning model and decrease performance outcome errors. For example, in one example of graph 300, the weight adjusted classification threshold 302 may be adjusted closer towards "0", such as below 0.5, according to the defined predictive weights that include the false positive (FP) predictive outcomes, the false negative (FN) predictive outcomes, true positive (TP) predictive outcomes, and the true negative (TN) predictive outcomes, which the FP, FN, TP, and the TN may be a weight or cost. The defined predictive weights may represent an acceptable performance baseline and acceptable performance outcome errors in the classification model. That is, the acceptable performance baseline and acceptable performance outcome errors may be acceptable costs to a customer or user according to need, user specifications, intended use, and/or performance costs that are acceptable or unacceptable. A data point may be classified according to the weight adjusted classification threshold in the classification model. For example, the true negative (TN) predictive outcomes may be 77.5%. The false negative (FN) predictive outcomes may be 8.9%. The false positive (FP) outcomes may be 5.6%. The true positive (TP) predictive outcomes may be 8.0%.

In one aspect, the weight adjusted classification threshold may be adjusted (e.g., adjusted along the X-axis) according to a change in one or more of the predictive weights. That is, the weight adjusted classification threshold may be adjusted to indicate an amount of error that may be tolerated for a ML model based on a computing application or computing resource system requirements. In one aspect, adjusting the weight adjusted classification threshold towards the right on the x-axis (e.g., closer to 1 than 0) may decrease the number of false positives (FP) and increase the number of false negatives (FN). Alternatively, adjusting the weight adjusted classification threshold towards the left on the x-axis (e.g., closer to 0 than 1) may increase the number of false positives (FP) and decrease the number of false negatives (FN).

Thus, according to system needs or user preferences, the weight adjusted classification threshold may be adjusted closer to 1 or closer to 0. The histogram 200 may be provided in a graphical user interface (GUI) interface and displayed on a device. The visualizations of the histogram may provide feedback to the device to illustrate the results of the sample event.

As an additional example, consider as scenario for determining whether a customer is likely to make a purchase. The weight adjusted classification threshold may be adjusted and set as the weight adjusted classification threshold at 0.82 according to the defined predictive weights that include the false positive (FP) predictive outcomes, the false negative (FN) predictive outcomes, true positive (TP) predictive outcomes, and the true negative (TN) predictive outcomes. Accordingly, only 1.3% of the predictions may be false positives, 22% may be false negatives, and 77% will be correct predictions. In this scenario, false positives may be considered as expensive, and the weight adjusted classification threshold value may be selected as high (e.g., close to 1 as opposed to low as being closer to 0) in order to avoid false positives. In this scenario, the weight adjusted classification threshold may avoid, for example, sending costly promotional materials to the "wrong" customers that are not likely to make a purchase.

Moreover, an action item may be identified to be performed for the sample events classified in a defined class having a value greater than the weight adjusted classification threshold. For example, consider the scenario where comments, tweets, responses and/or feedback using social media relating to the use of a service provider environment may be classified according to the embodiments described herein. Each comment, tweet, response and/or feedback may be classified as actionable or non-actionable. For example, each comment, tweet, response and/or feedback that may result in a churn, a performance cost, loss of business, and/or computing resource inefficiency, such as, for example, complaints or items relating to customer service or computer efficiency, may be classified as an action item that may imply one or more action item (e.g., contact the customer or user responsible for the comment, tweet, response and/or feedback). Alternatively, non-actionable items may be just a comment, tweet, response and/or feedback that is has little to no impact on churn, a performance cost, loss of business, and/or computer resource efficiency, such as, for example "congratulations, on the new release". In one action the weighted adjusted classification threshold is classifying each comment, tweet, response and/or feedback. That is, each comment, tweet, response and/or feedback may be assigned a predictive weight for false positive outcomes, false negative outcomes, true positive outcomes, and true negative outcomes in order to determine the appropriate performance cost, expense, performance baseline, and/or computing inefficiency threshold. For example, if a comment, tweet, response and/or feedback is identified as "non-actionable" but is sent to a customer service department associated with the service provider environment, there is a performance cost, performance baseline, and/or computing inefficiency cost that may be associated with the cost for the false positive or false negative predictive outcome. Accordingly, the weight adjusted classification threshold may be automatically determined according to the defined predictive weights (e.g., a weighted cost or percentage) that include the false positive (FP) predictive outcome values or weights, the false negative (FN) predictive outcome values or weights, true positive (TP) predictive outcome values or weights, and the true negative (TN) predictive outcome values or weights.

Figure 4:
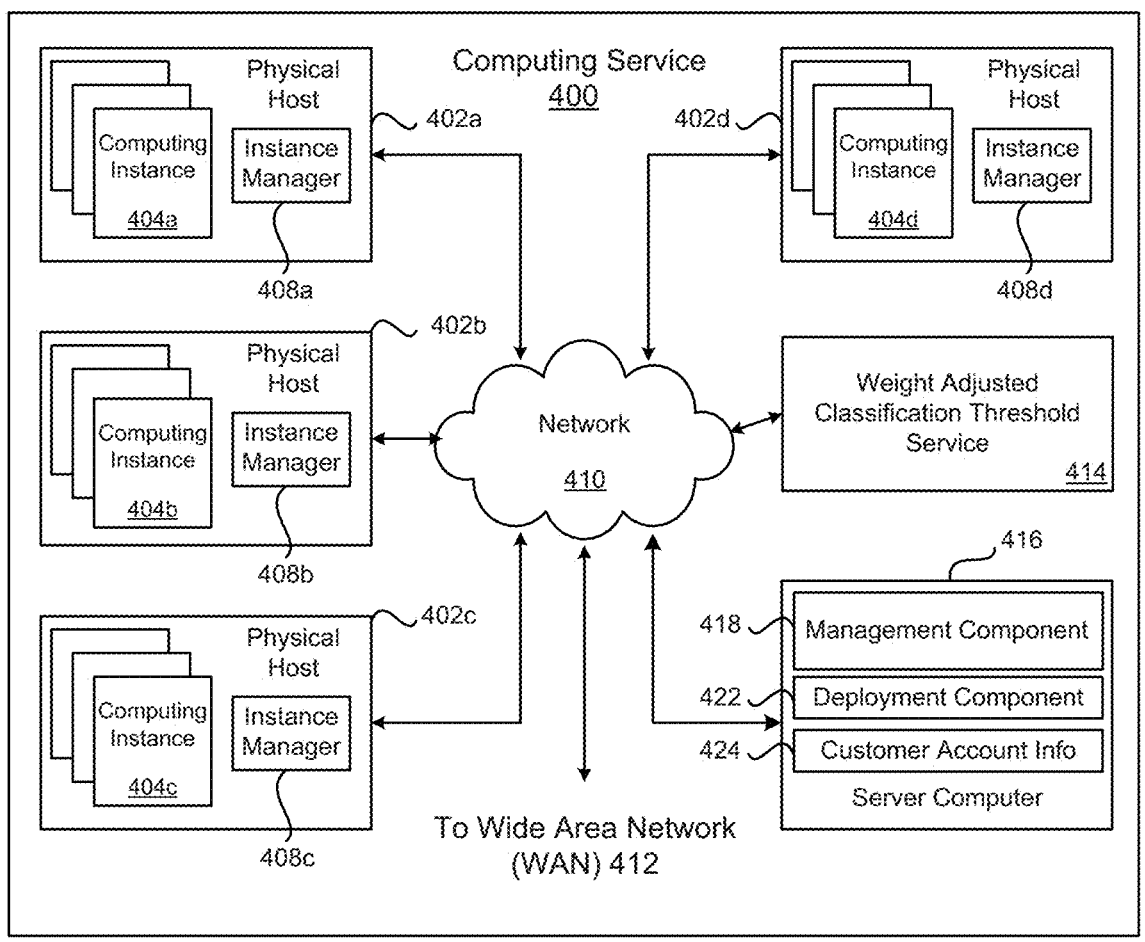
FIG. 4 illustrates an example of a weight adjusted threshold service in a computing service according to an example of the present technology.

FIG. 4 is a block diagram illustrating an example computing service 400 that may be used to execute software services for tuning of a machine learning model in a computing service environment. In particular, the computing service 400 depicted illustrates one environment in which the technology described herein may be used. The computing service 400 may be one type of environment that includes various virtualized service resources that may be used, for instance, to host computing instances 404a-d on which a computing service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e., a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

Some of the servers may be used for automated tuning of a machine learning model. For example, a server computer 414 may execute a weight adjusted classification threshold service in a service provider environment according to an example of the present technology.

One or more server computers 416 may be reserved to execute software components for managing the operation of the computing service 400 and the computing instances 404a-d. A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache may be prepared, and other types of information. The deployment component 422 may utilize the customer-provided configuration and cache logic to configure, initialize, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified; many more networks and networking devices may be utilized to interconnect the various computing systems disclosed herein.

Figure 5:
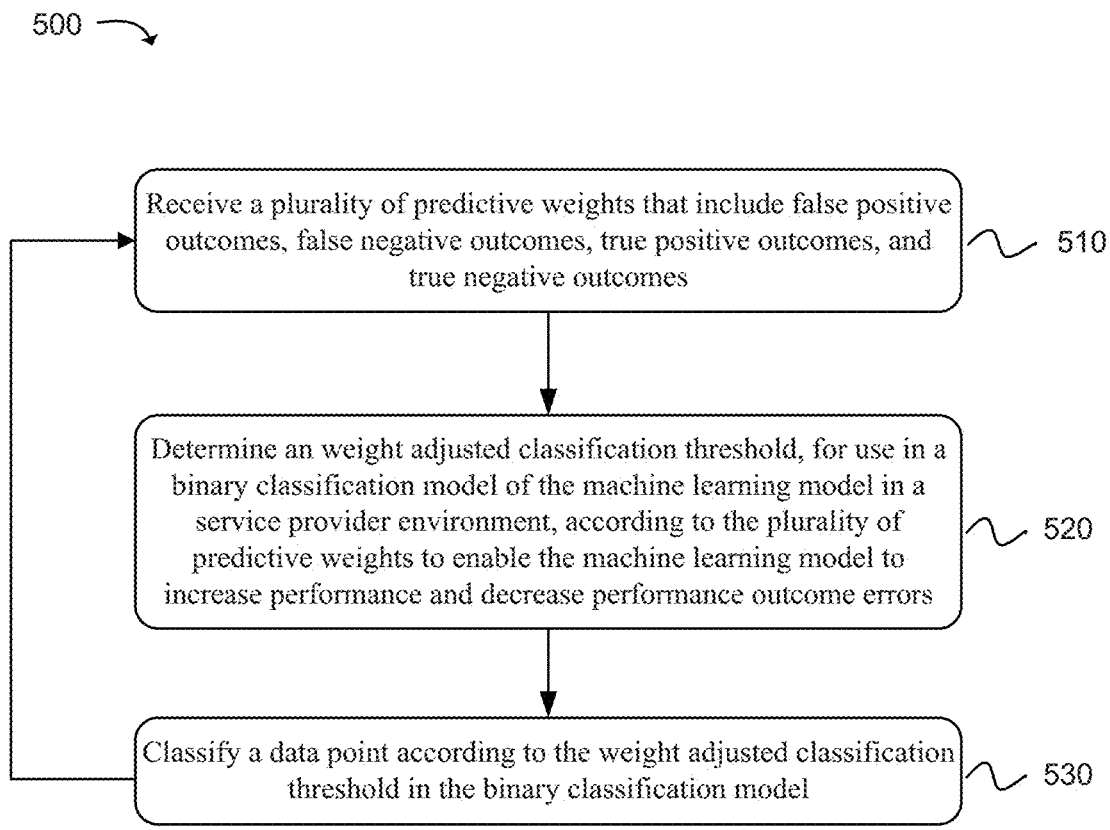
FIG. 5 is a flowchart of an example method for tuning a machine learning model using predictive weights in a classification model in a service provider environment according to an example of the present technology.

FIG. 5 is a flowchart of an additional example method 500 for tuning a machine learning module using predictive weights in classification machine learning model in a service provider environment according to an example of the present technology. The functionality 500 may be implemented as a method executed as instructions on a machine, where the instructions may be included on at least one computer readable medium or one non-transitory machine-readable storage medium. Starting in block 510, a plurality of predictive weights that include false positive outcomes, false negative outcomes, true positive outcomes, and true negative outcomes may be received. A weight adjusted classification threshold may be determined, for use in a classification model (e.g., a binary classification model and/or a multi classification model) in a service provider environment, according to the predictive weights to enable the machine learning model to increase the total value of the machine learning model and decrease performance outcome errors, as in block 520. One or more data points and/or features of the one or more data points may be classified according to the weight adjusted classification threshold in the classification model, as in block 530. If the results of model are unsatisfactory, then updated predictive weights may be provided and the process may be repeated as illustrated by the return arrow from the last operational block 530 to the first operational block 510.

Figure 6:
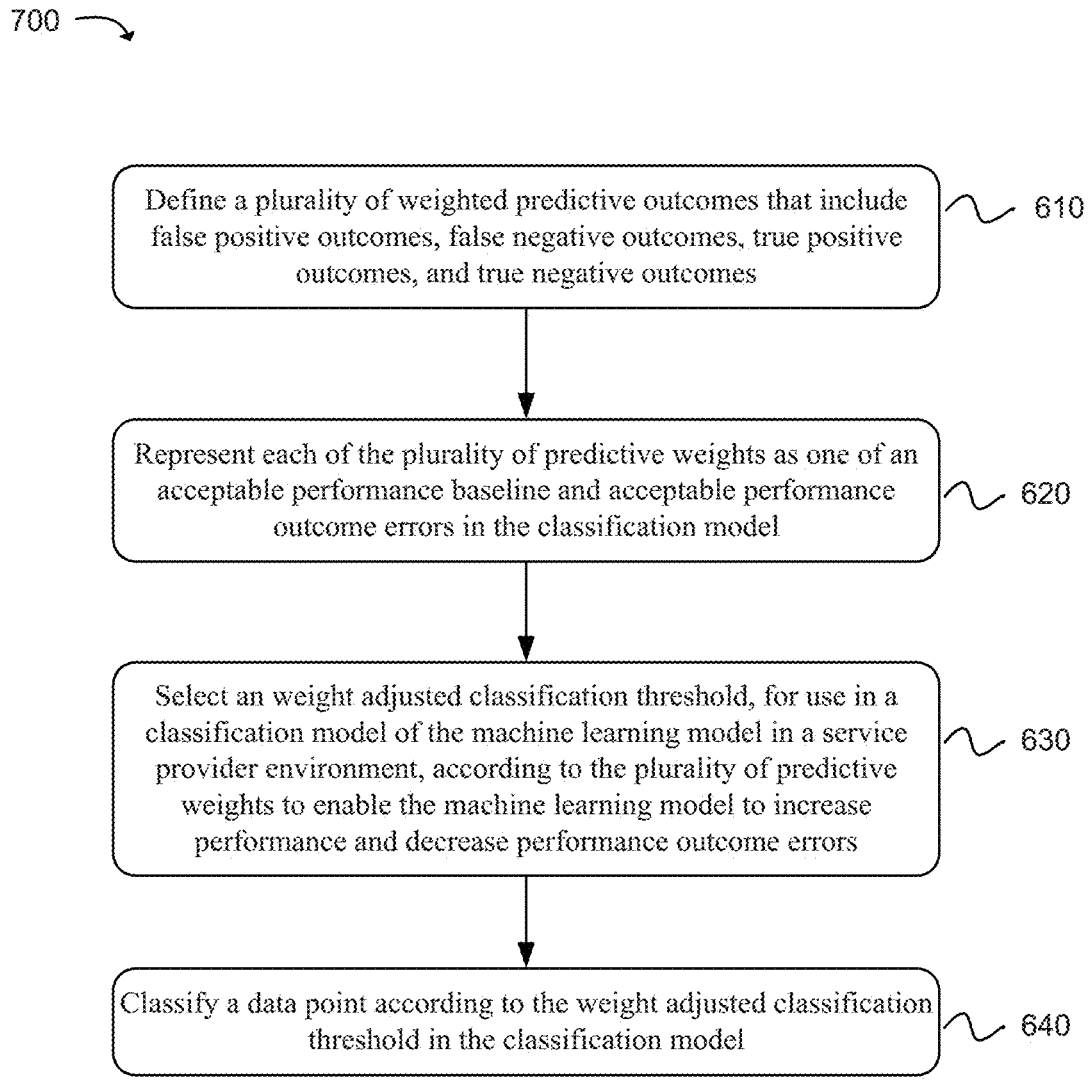
FIG. 6 is a flowchart of an additional example method for tuning a machine learning module by selecting a weight adjusted classification threshold using predictive weights in a service provider environment according to an example of the present technology.

FIG. 6 is a flowchart of an additional example method 700 for tuning a machine learning module by computing a weight adjusted classification threshold using predictive weights in a service provider environment according to an example of the present technology. The functionality may be implemented as a method executed as instructions on a machine, where the instructions may be included on at least one computer readable medium or one non-transitory machine-readable storage medium. Starting in block 610, a plurality of predictive weights that include false positive outcomes, false negative outcomes, true positive outcomes, and true negative outcomes may be defined. Each of the plurality of predictive weights may be represented as one of an acceptable performance baseline and acceptable performance outcome errors in the classification model, as in block 620. A weight adjusted classification threshold may be selected and/or calculated for use in a classification model of the machine learning model in a service provider environment, according to the plurality of predictive weights to enable the machine learning model to increase the total value of the machine learning model and decrease performance outcome errors, as in block 630. A data point may be classified according to the weight adjusted classification threshold in the classification model, as in block 640.

Figure 7:
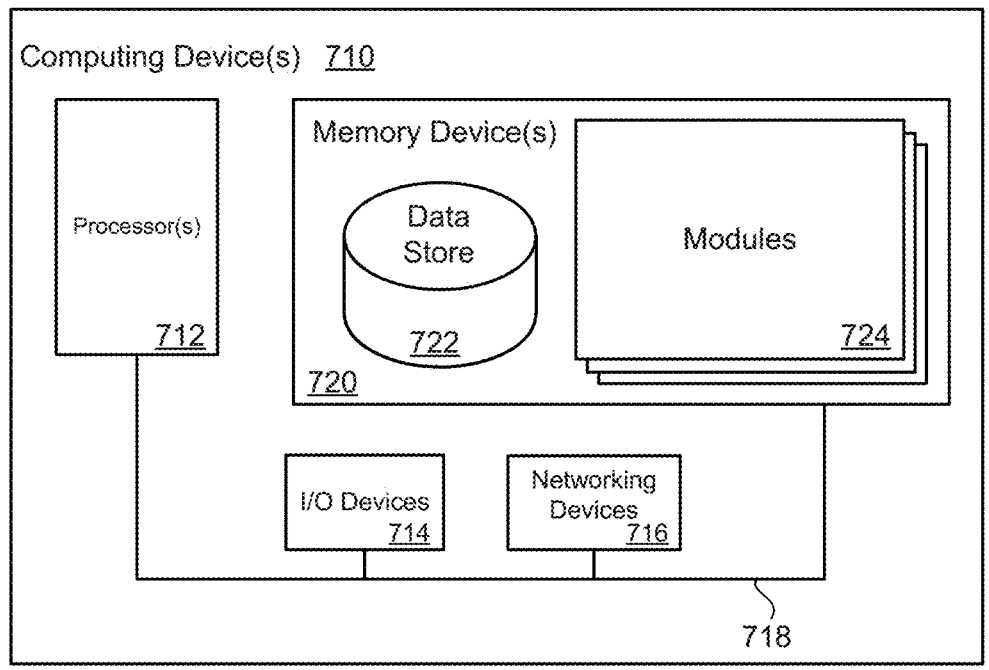
FIG. 7 is a block diagram that provides an example illustration of a computing device that may be employed in the present technology.

In one aspect, in conjunction with and/or as part of at least one block of FIGS. 5-7, the operations of 500, 600, and/or 700 may include each of the following. The operations of 500, 600, and/or 700 may adjust the weight adjusted classification threshold according to a change in the plurality of predictive weights. Each of the predictive weights may be selectively adjusted by decreasing a number of the false positive outcomes and increasing the number of false negative outcomes to optimize the weight adjusted classification threshold. Each of the predictive weights may alternatively be selectively adjusted by increasing a number of the false positive outcomes and increasing the number of false negative outcomes to optimize the weight adjusted classification threshold. Each of the plurality of predictive weights may be represented as a percentage of an acceptable performance baseline and/or acceptable performance outcome errors in the classification model. The weight adjusted classification threshold may be defined as being a numerical value between zero (0) to one (1). Moreover, an action item may be identified to be performed for the sample events classified in a defined class having a value greater than the weight adjusted classification threshold. The classification model may be provided using a service in the service provider environment and is one of a binary classification model and a multi-classification model. The classification model or histogram may be displayed in a graphical user interface (GUI) on a display device.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device may include a local communication interface 718 for the components in the computing device. For example, the local communication interface may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. An example of an I/O device is a display screen that is available to display output from the computing devices. Other known I/O device may be used with the computing device as desired. Networking devices 716 and similar communication devices may be included in the computing device. The networking devices 716 may be wired or wireless networking devices that connect to the Internet, a LAN, WAN, or other computing network.

The components or modules that are shown as being stored in the memory device 820 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid-state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for automated tuning of a machine learning model in a computing service environment, comprising:
   under control of at least one processor and memory configured with executable instructions that:
   receive a plurality of predictive weights associated with a plurality of metrics to measure predictive accuracy that include false positive outcome weights, false negative outcome weights, true positive outcome weights, and true negative outcome weights;
   determine a weight adjusted classification threshold indicating an amount of error tolerated in a computing application, for use in a binary classification model of the machine learning model in a service provider environment hosting the computing application, according to the plurality of predictive weights to enable the machine learning model to increase a total value of the machine learning model and decrease performance outcome errors;
   receive adjusted values for the plurality of predictive weights, the adjusted values for the plurality of predictive weights indicating a modified value for one of false positive predictive outcomes or false negative predictive outcomes;
   adjust the weight adjusted classification threshold based at least in part on the adjusted values for the plurality of predictive weights, including one of increasing the weight adjusted classification threshold when the adjusted values for the predictive weights indicate an increased weight for false positive predictive outcomes or a decreased weight for false negative predictive outcomes, or decreasing the weight adjusted classification threshold when the adjusted values for the predictive weights indicate an increased weight for false negative predictive outcomes or a decreased weight for false positive predictive outcomes; and
   classify a data point according to the weight adjusted classification threshold in the binary classification model.

2. The method of claim 1, wherein the executable instructions further selectively adjust the weight adjusted classification threshold by decreasing a number of the false positive outcomes and increasing the number of false negative outcomes to optimize the weight adjusted classification threshold.

3. The method of claim 1, wherein the executable instructions further selectively adjust the weight adjusted classification threshold by increasing a number of the false positive outcomes and decreasing the number of false negative outcomes to optimize the weight adjusted classification threshold.

4. The method of claim 1, wherein the executable instructions further represent each of the plurality of predictive weights as one of a performance baseline and performance outcome errors in the binary classification model.

5. The method of claim 1, wherein the binary classification model is provided as a service in the service provider environment.

6. A method, using at least one processor and memory configured with executable instructions that:
   under control of at least one processor and memory configured with executable instructions that:
   receive a plurality of predictive weights associated with a plurality of metrics to measure predictive accuracy that include false positive outcomes, false negative outcomes, true positive outcomes, and true negative outcomes;

select a weight adjusted classification threshold indicating an amount of error tolerated in a computing application, for use in a classification model of a machine learning model in a service provider environment hosting the computing application, according to the plurality of predictive weights to enable the machine learning model to increase a total value of the machine learning model and decrease performance outcome errors;

receive adjusted values for the plurality of predictive weights, the adjusted values for the plurality of predictive weights indicating a modified value for one of false positive predictive outcomes or false negative predictive outcomes;

adjust the weight adjusted classification threshold based at least in part on the adjusted values for the plurality of predictive weights, including one of increasing the weight adjusted classification threshold when the adjusted values for the predictive weights indicate an increased weight for false positive predictive outcomes or a decreased weight for false negative predictive outcomes, or decreasing the weight adjusted classification threshold when the adjusted values for the predictive weights indicate an increased weight for false negative predictive outcomes or a decreased weight for false positive predictive outcomes; and classify a data point according to the weight adjusted classification threshold in the classification model.

7. The method of claim 6, wherein the executable instructions further adjust the weight adjusted classification threshold according to a change in the plurality of predictive weights.

8. The method of claim 6, wherein the executable instructions further selectively adjust the plurality of predictive weights by decreasing a number of the false positive outcomes and increasing a number of false negative outcomes to optimize the weight adjusted classification threshold.

9. The method of claim 6, wherein the executable instructions further selectively adjust the plurality of predictive weights by increasing a number of the false positive outcomes and decreasing a number of false negative outcomes to optimize the weight adjusted classification threshold.

10. The method of claim 6, wherein the executable instructions further represent each of the plurality of predictive weights as one of a performance baseline and performance outcome errors in the classification model.

11. The method of claim 6, wherein the executable instructions further define the weight adjusted classification threshold as a numerical value between zero (0) to one (1).

12. The method of claim 11, wherein the executable instructions further identify an action item to be performed in the service provider environment for sample events classified in a defined class having a value greater than the weight adjusted classification threshold.

13. The method of claim 6, wherein the interface is at least one of:

a user interface to enable a user to enter the adjusted values for the plurality of predictive weights; or an application interface to provide the adjusted values for the plurality of predictive weights based at least in part on a desired outcome for the classification model.

14. The method of claim 6, wherein the executable instructions further display a histogram of an output the classification model in a graphical user interface (GUI) on a display device.

15. At least one machine readable storage medium having instructions embodied thereon, the instructions when executed cause one or more processors and memory to:

receive a plurality of predictive weights associated with a plurality of metrics to measure predictive accuracy that include false positive outcomes, false negative outcomes, true positive outcomes, and true negative outcomes;

represent each of the plurality of predictive weights as acceptable performance outcome errors in a classification model;

select a weight adjusted classification threshold indicating an amount of error tolerated in a computing application, for use in the classification model of a machine learning model in a service provider environment hosting the computing application, according to the plurality of predictive weights to enable the machine learning model to increase a total value of the machine learning model and decrease performance outcome errors;

receive adjusted values for the plurality of predictive weights, the adjusted values for the plurality of predictive weights indicating a modified value for one of false positive predictive outcomes or false negative predictive outcomes;

adjust the weight adjusted classification threshold based at least in part on the adjusted values for the plurality of predictive weights, including one of increasing the weight adjusted classification threshold when the adjusted values for the predictive weights indicate an increased weight for false positive predictive outcomes or a decreased weight for false negative predictive outcomes, or decreasing the weight adjusted classification threshold when the adjusted values for the predictive weights indicate an increased weight for false negative predictive outcomes or a decreased weight for false positive predictive outcomes; and classify a data point according to the weight adjusted classification threshold in the classification model.

16. The at least one machine readable storage medium of claim 15, wherein the instructions when executed cause the one or more processors and memory to define the plurality of predictive weights using costs to a user associated with an intended use of the machine learning model.

17. The at least one machine readable storage medium of claim 15, wherein the instructions when executed cause the one or more processors and memory to selectively adjust the plurality of predictive weights by decreasing a number of the false positive outcomes and increasing a number of false negative outcomes to optimize the weight adjusted classification threshold.

18. The at least one machine readable storage medium of claim 15, wherein the instructions when executed cause the one or more processors and memory to selectively adjust the plurality of predictive weights by increasing a number of the false positive outcomes and decreasing a number of false negative outcome to optimize the weight adjusted classification threshold.

19. The at least one machine readable storage medium of claim 15, wherein the instructions when executed cause the one or more processors and memory to define the weight adjusted classification threshold as being a numerical value between zero (0) to one (1).

20. The at least one machine readable storage medium of claim 15, wherein the instructions when executed cause the one or more processors and memory to identify an action item to be performed in the service provider environment for sample events classified in a defined class having a value greater than the weight adjusted classification threshold, wherein the classification model is at least one of a binary classification model or a multiclassification model provider environment.

* * * * *